F. I. DU PONT.
PROCESS OF AND APPARATUS FOR OBTAINING OXIDS OF NITROGEN FROM ATMOSPHERIC AIR.
APPLICATION FILED JULY 15, 1919.
1,370,295.
Patented Mar. 1, 1921.
4 SHEETS—SHEET 2.
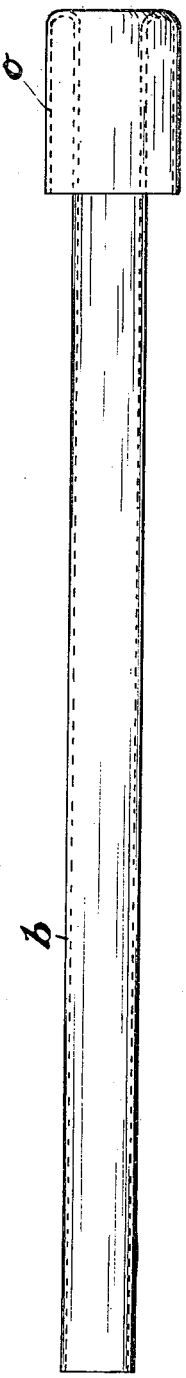
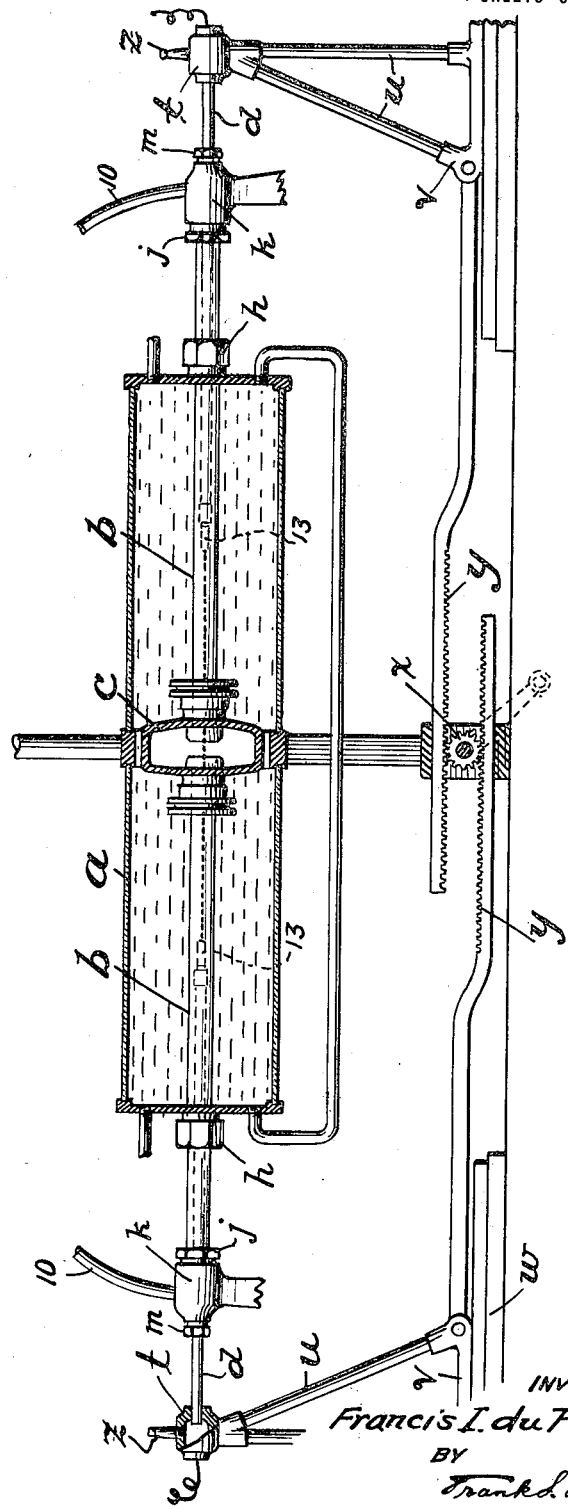
WITNESS:
Rob't R. Kitchel
INVENTOR
Francis I. du Pont
BY
Frank L. Busser
ATTORNEY.

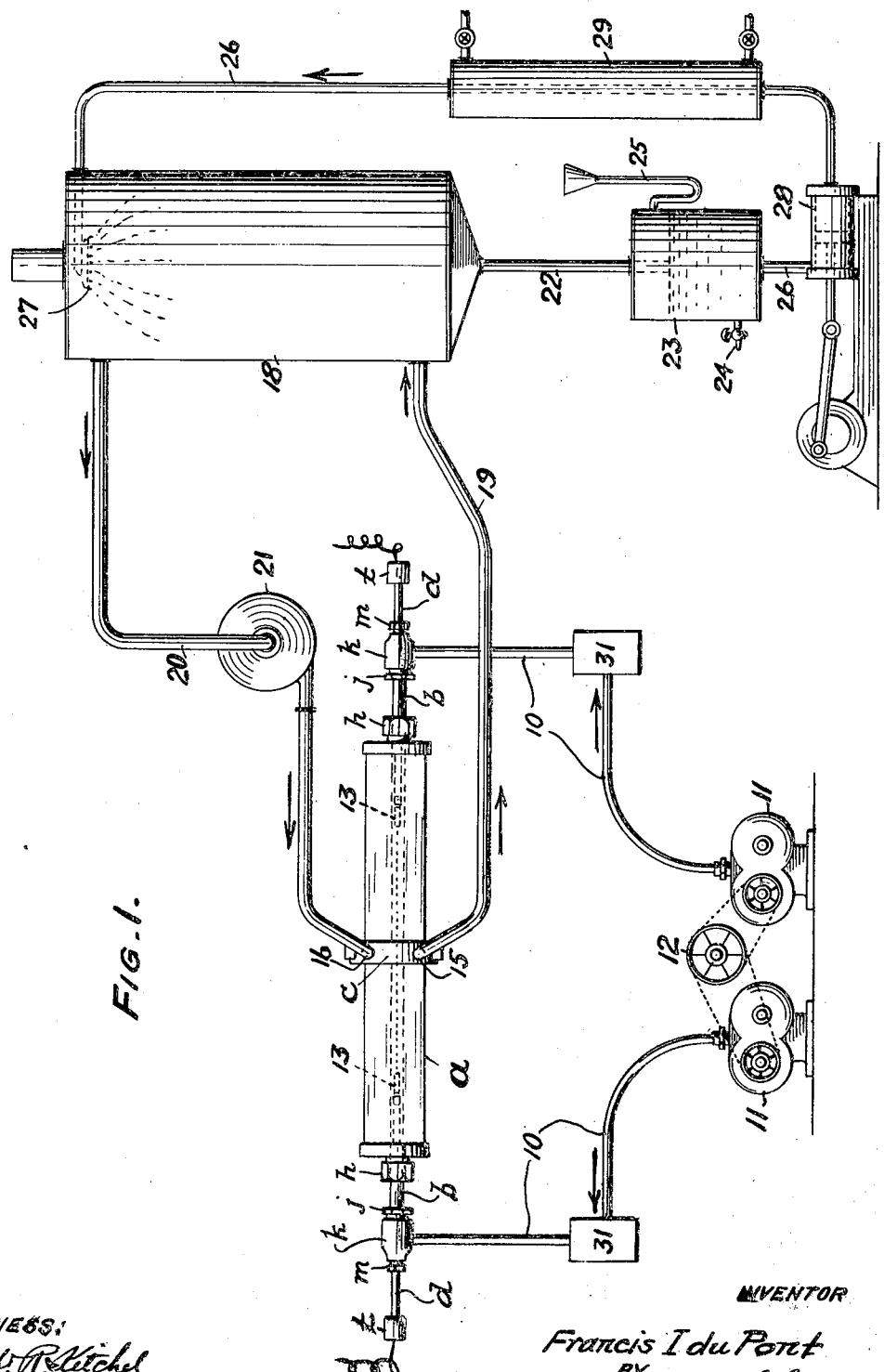

F. I. DU PONT.
PROCESS OF AND APPARATUS FOR OBTAINING OXIDS OF NITROGEN FROM ATMOSPHERIC AIR.
APPLICATION FILED JULY 15, 1919.

1,370,295.

Patented Mar. 1, 1921.
4 SHEETS—SHEET 3.

WITNESS:
Rob. W. Kitchel

INVENTOR
Francis I. du Pont
BY
Frank S. Busser
ATTORNEY.

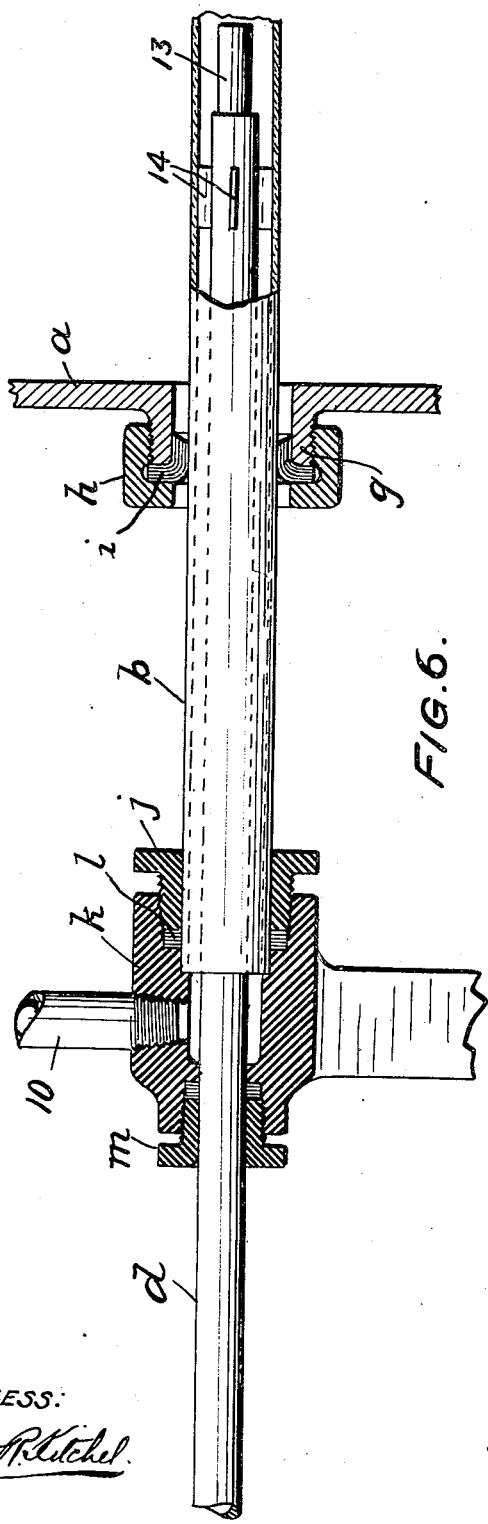

UNITED STATES PATENT OFFICE.

FRANCIS I. du PONT, OF WILMINGTON, DELAWARE.

PROCESS OF AND APPARATUS FOR OBTAINING OXIDS OF NITROGEN FROM ATMOSPHERIC AIR.

1,370,295.  Specification of Letters Patent.  Patented Mar. 1, 1921.

Application filed July 15, 1919. Serial No. 311,032.

*To all whom it may concern:*

Be it known that I, FRANCIS I. DU PONT, a citizen of the United States, residing at Wilmington, county of New Castle, and State of Delaware, have invented a new and useful Improvement in Processes of and Apparatus for Obtaining Oxids of Nitrogen from Atmospheric Air, of which the following is a full, clear, and exact description, reference being had to the accompanying drawings, which form a part of this specification.

In an application filed by me March 26, 1915, Serial No. 17,116, I have set forth an apparatus for forming oxids of nitrogen from atmospheric air or other mixtures of oxygen and nitrogen, which comprises, among other features, electrodes between which the arc is formed, two alining tubes of insulating material adapted to inclose the arc, and an enlarged central chamber between the tubes and which, with the tubes, form a continuous reaction chamber through which the electric arc extends.

The object of the present invention is to modify the construction of the apparatus above referred to as well as the process carried out therein so as to substantially improve the operation and enhance the efficiency. Such improvements comprise: means whereby the water or other cooling medium may be brought closer to the center of the central chamber and right up to the point where the hot gases leave the arc; means to protect the packing from the excessive heat of the arc and the gases; and an improved method and an improved means for cooling and absorbing the escaping gases whereby sudden cooling is effected by mixing with the gases, at the instant of their exit from the arc tube into the central chamber, a relatively large percentage of the same exit gases which, however, have been already cooled.

In the present construction, no advantage arises from imparting to the gases, as they enter the arc tubes, a whirling motion.

A preferred embodiment of my invention is shown in the accompanying drawings, in which—

Figure 1 is a diagrammatic view of the apparatus.

Fig. 2 is an enlarged view of the reaction chamber, the surrounding cylinder, the electrodes, and the means for advancing and retracting the electrodes.

Fig. 3 is a detail view of one of the tubes of the reaction chamber.

Fig. 6 is a side view, partly broken away and partly sectional, of one end of the reaction chamber, the corresponding electrodes, and the packing for both.

The cylinder $a$, which incloses the reaction chamber hereinafter described, is composed of two parts. The reaction chamber is composed of two tubes $b$ and an enlarged central casing $c$. Into the outer end portion of each tube extends an electrode $d$.

The solid peripheral portion of the casing $c$ is recessed annularly on opposite sides to receive packing rings $e$ (see Fig. 4) against which the inner ends of the two halves of the cylinder $a$ are pressed. Holes $f$ extending through the solid peripheral portion of the casing permit circulation of the water or other cooling medium from one part to the other of the cylinder. It will be understood that in operation the cylinder is filled with this cooling medium.

The end walls of the cylinder $a$ have axial orifices somewhat larger than the diameter of the tubes $b$, which extend through the respective orifices and for substantial distances beyond the ends of the cylinder. A neck $g$ extends outside each end wall in alinement with the orifice therein. On the neck $g$ is threaded a sleeve $h$ having an end flange between which and the end of the neck is confined a soft rubber packing ring $i$, which extends between the tube $b$ and the neck $g$ and renders the joint between the tube and cylinder water-tight.

Near the end of each tube $b$ is a gland $j$ threaded within a casing $k$ and confining between them asbestos packing $l$. The casing $k$ has a hollow chamber forming a prolongation of the tube $b$. The casing has a stuffing box $m$ through which slides the electrode $d$. The casing $k$ should be of insulating material or rest on an insulator support.

Communicating with the interior of each casing $k$ is an air pipe 10 in which is interposed a pre-heater 31. Each pipe 10 is connected to a blower 11. The two blowers are driven from a common pulley 12 on a driving shaft.

Figure 4:
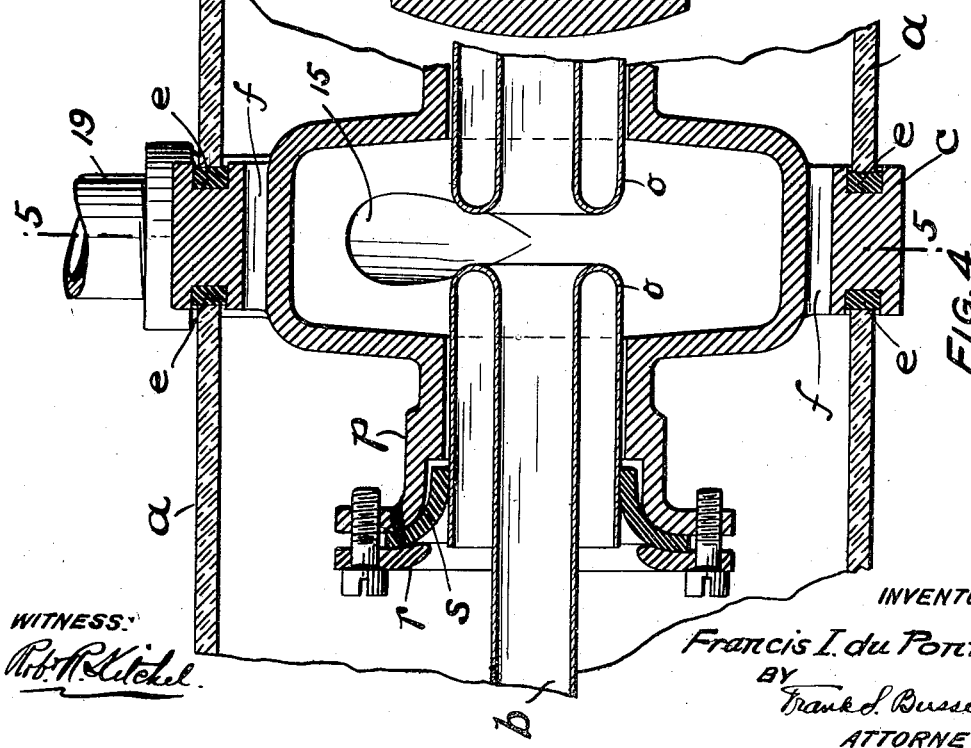
Fig. 4 is an enlarged longitudinal section through the central part of the reaction chamber and cylinder.

Each tube $b$ extends within the central casing $c$ to within a comparatively short distance of its center, the end of the tube being bent back upon itself, as shown in Figs. 3 and 4, affording an annular space between the body of the tube and its reversely bent end $o$ for receiving and containing the cooling medium, which is thus brought right up to the point where the hot gases escape from the arc, as will be hereinafter described. The central casing has annular flanges $p$ surrounding the reversely bent ends of the tubes. Each flange is bent outward at its ends, and to this outward bend is attached, conveniently by screws, a ring $r$, which confines a rubber packing ring $s$ against the flange $p$ and against the reversely bent end of the tube $b$ near its extremity. This packing seals the interior of cylinder $b$ and the interior of casing $c$ from the interior of the water jacket $a$. The construction effectively protects the packing $s$ from the hot gases within the casing.

As shown in Fig. 2, the outer ends of the electrodes are carried by heads $t$, which are connected to opposite poles of a source of current supply. Each head $t$ (which is of electrically conductive material) is supported on legs $u$ (of non-conductive material) extending upward from a slide $v$ movable longitudinally in ways on a base $w$. The two slides are operable in unison, in opposite directions, by a pinion $x$ engaging racks $y$ connected with the slides.

Each electrode $d$ has at its inner end a block of carbon 13, constituting a pole or electrode proper, as shown in Fig. 7. The electrode also carries radial wings 14, which center the electrode within its tube $b$.

The cylinder $a$ is of glass. The tubes $b$ should be made of fine rock crystal silica, which is fire-proof.

Figure 5:
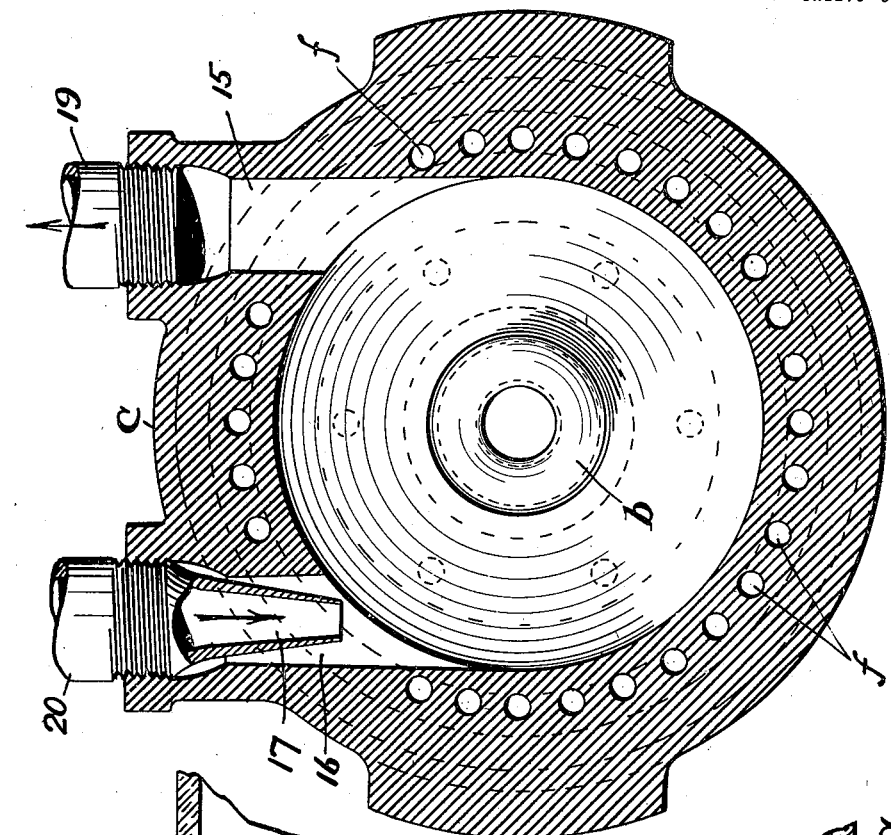
Fig. 5 is a cross-section on the line 5—5 of Fig. 4.

The enlarged central chamber $c$ is provided with two openings 15 and 16, as shown in Figs. 4 and 5, both arranged tangentially to the inner circular wall of the chamber and obliquely to intersecting radii of the reaction chamber. The opening 15 is for the exit of the gases. Within the opening 16 is a nozzle 17 out of which into the central chamber are forced previously formed gases. The direction of extension of each of the two openings 15 and 16 is tangential to the inner wall of the casing $c$. I find that the expulsion of the gases from the reaction chamber at the desired rate may be effectively secured by utilizing the force of a positively propelled stream of incoming gas, which the arrangement described effects: this operation also producing another and very important advantage, as hereinafter described.

Referring again to Fig. 1: 18 is a cooler and absorber between the bottom of which and the opening 15 is a pipe 19. Between the top of the cooler and absorber and the nozzle 17 is a pipe 20, in which is interposed a blower 21. From the bottom of the absorber 18 depends an outflow pipe 22 leading to a reservoir 23, provided with a cock 24 to draw off the nitric acid and a funnel and pipe 25 into which water may be introduced from time to time. From the bottom of the reservoir extends an outflow pipe 26, which is carried up to a sprayer 27 in the upper part of the absorber 18. In the pipe 26 are interposed a pump 28 and a cooler 29.

The operation of the apparatus is as follows:

The electrodes $d$ are brought together and then separated, as shown in Figs. 1 and 2, thereby producing an arc extending axially along the reaction chamber $b$, $b$, $c$. The blowers 11 force equal quantities of air through the two pipes 10 into the reaction chambers. The cylinder is supplied with water so that the tubes $b$ and chamber $c$ are water-cooled. The application of a cooling medium to the tube is of importance, as otherwise the tube, although of non-conducting material, would become conductive at the high temperature which the process contemplates, resulting in short circuiting of the arc.

By maintaining the wall of the reaction tube non-conducting, it may be brought in close proximity to the arc without danger of short circuiting.

The enlarged central chamber together with the tangential gas-exit and gas-admission passages 15 and 16 are of importance, in that a rotary motion of the gases is established in the central chamber and the suction of outgoing gases does not therefore tend to displace the arc.

The gases discharged from the exit 15 pass to the cooler and absorber 18, where they are acted upon by a spray of water or other liquid. When the normal operation of the apparatus is once established, this spray will supply dilute nitric acid. A portion of the gases are absorbed and the dilute acid thus formed is carried to the reservoir, from which the acid is pumped back to the spray at a rate less than its rate of condensation, thereby causing a gradual accumulation of acid in the reservoir, which may be withdrawn from time to time.

The total volume of gases passing into the absorber within a given time is much greater than the volume acted upon by the arc within the same time, the remainder being forced back by the blower 21, through pipe 20 and the admission port 16 to the central chamber $c$, where they mix with the gases escaping from the electric arc, and with them, return to the absorber through pipe 19. The circulation of gases through the absorber is therefore in much greater volume than that of the gases being delivered to the arc. Thus the escaping gases are instantly diluted with an enormous volume of cooled gases, which effects a very great and sudden reduction of their temperature.

The temperature of the entire contents of chamber c may thus be kept down as low as desired and the escaping gases are diluted with cooled gases in an incredibly short space of time.

By using, the escaping gases themselves as a diluent, extreme sudden cooling is accomplished without introducing a diluent such as unaltered air.

Where, in this specification, the word "air" is used, I wish, of course, to comprehend different mixtures of oxygen and nitrogen, including those in which atmospheric air is enriched in oxygen.

Having now fully described my invention, what I claim and desire to protect by Letters Patent is:

1. An apparatus of the character described comprising a tubular reaction chamber having gas inlets and an enlarged central portion, poles between which an electric arc may be formed extending within and longitudinally of the tube, an exit port for gases in said enlarged central portion of the chamber, and an admission port for gases in said enlarged central portion adapted to coöperate with the exit port to maintain a whirling motion of the gases and facilitate their escape.

2. An apparatus of the character described comprising a tubular reaction chamber having gas inlets and an enlarged central portion, poles between which an electric arc may be formed extending within and longitudinally of the tube, an exit port for gases in said enlarged central portion of the chamber, and an admission port for gases in said enlarged central portion, both said ports being arranged obliquely to intersecting radii of the reaction chamber.

3. An apparatus of the character described comprising a tubular reaction chamber having air inlet ports, poles between which an electric arc may be formed within the chamber, a gas outlet port in the reaction chamber, a cooler for the gases escaping from the reaction chamber, and means to convey gases from the cooler into proximity to the gases leaving the reaction chamber to effect a sudden and substantial reduction in the temperature of the escaping gases.

4. An apparatus of the character described comprising a tubular reaction chamber having air inlet ports, poles between which an electric arc may be formed within the chamber, a gas outlet port in the reaction chamber, a cooler for the gases escaping from the reaction chamber, and means to bring into admixture with the hot gases as they escape from the reaction chamber gases so cooled in substantially greater volume than the gases delivered to the arc.

5. An apparatus of the character described comprising a tubular reaction chamber having air inlet ports, poles between which an electric arc may be formed within the chamber, means forming an endless path for gases including a gas inlet port and a coöperating gas outlet port in the reaction chamber, and a cooler interposed in said path, whereby the gases escaping from the arc through said outlet port are suddenly and substantially cooled by contact with a substantially larger volume of previously formed cooled gases.

6. An apparatus of the character described comprising a tubular reaction chamber having air inlet ports, poles between which an electric arc may be formed within the chamber, means forming an endless path for gases including a gas inlet port and a cooperating gas outlet port in the reaction chamber and a cooler interposed in said path, whereby the gases escaping from the arc through said outlet port are immediately cooled by contact with a substantially larger volume of previously formed cooled gases, and means to establish a forced circulation of the gases around said path.

7. An apparatus of the character described comprising a tubular reaction chamber having air inlet ports, poles between which an electric arc may be formed within the chamber, means forming an endless path for gases including a gas inlet port and a coöperating gas outlet port in the reaction chamber, a cooler and absorber interposed in said path, an acid reservoir communicating with the cooler and absorber, and means to convey liquid from said reservoir to the cooler and absorber.

8. An apparatus of the character described comprising a tubular reaction chamber having air inlet ports, poles between which an electric arc may be formed within the chamber, means forming an endless path for gases including a gas inlet port and a coöperating gas outlet port in the reaction chamber, a cooler and absorber interposed in said path, an acid reservoir communicating with and adapted to receive liquid from the cooler and absorber, means to convey liquid from said reservoir to the cooler and absorber, and means to establish a forced circulation of the gases around said path.

9. An apparatus of the character described comprising a tubular reaction chamber having gas inlets and an enlarged central portion, poles between which an electric arc may be formed extending within and longitudinally of the tube, a gas outlet port in the enlarged central portion of the reaction chamber, a cooler for the gases escaping from the reaction chamber, and means to convey gases from the cooler into proximity to the gases leaving the reaction chamber to effect a sudden and substantial reduction in the temperature of the escaping gases.

10. An apparatus of the character described comprising a tube, an enlarged chamber communicating therewith, means to establish an electric arc in said tube and chamber, means to admit air to the tube, means permitting the escape of gases from said enlarged chamber, the end of said tube extending into said chamber and turned back upon itself to afford an annular space between the body of the tube and the reversely bent end, and a cylinder surrounding the tube and adapted to contain a cooling medium, whereby the latter may be brought up to the point where the gases pass from the tube into said enlarged chamber.

11. An apparatus of the character described comprising a tube, an enlarged chamber communicating therewith, means to establish an electric arc in said tube and chamber, means to admit air to the tube, means permitting the escape of gases from said enlarged chamber, the end of said tube extending into said chamber and turned back upon itself to afford an annular space between the body of the tube and the reversely bent end, a cylinder surrounding the tube and adapted to contain a cooling medium, and packing between the tube and the casing of the enlarged chamber arranged around the reversely bent end of the tube at a distance from the chamber, thereby protecting the packing from excessive heat.

12. An apparatus of the character described comprising two alining spaced-apart tubes, each having a gas inlet, a casing connecting the tubes and of substantially greater diameter than the tubes and forming with them the reaction chamber, poles between which an electric arc is adapted to be formed extending along the axis of the tube with its center in the chamber of the casing, a gas outlet port in the casing, annular flanges on the casing surrounding the inner ends of the respective tubes, each tube extending into the chamber of the casing and bent back upon itself to form an open-ended annular space between the body of the tube and its reversely bent end; and a cylinder surrounding the tube and adapted to contain a cooling medium.

13. An apparatus of the character described comprising two alining spaced apart tubes, each having a gas inlet, a casing connecting the tubes and of substantially greater diameter than the tubes and forming with them the reaction chamber, poles between which an electric arc is adapted to be formed extending along the axis of the tube with its center in the chamber of the casing, a gas outlet port in the casing, annular flanges on the casing surrounding the inner ends of the respective tubes, each tube extending into the chamber of the casing and bent back upon itself to form an open-ended annular space between the body of the tube and its reversely bent end, a cylinder surrounding the tube and adapted to contain a cooling medium, and packing between said flanges and the reversely bent ends of the tubes.

14. An apparatus of the character described comprising a tubular reaction chamber having a central enlarged portion, a cylinder surrounding the parts of the tubular chamber adjacent the central enlarged portion, electrodes extending into opposite ends of the tubular chamber, and air pipes communicating with opposite ends of the tubular chamber.

15. The process of forming oxides of nitrogen from mixtures of oxygen and nitrogen, which consists in bringing said mixed gases under the influence of an electric arc, cooling the gases of reaction, and conveying the cooled gases adjacent to the locus of reaction to effect a sudden and substantial reduction in the temperature of fresh volumes of gases that have been acted upon by the electric arc.

16. The process of forming oxides of nitrogen from mixtures of oxygen and nitrogen, which consists in bringing said mixed gases under the influence of an electric arc, and subjecting the gases that have been acted upon by the arc to two cooling actions, one as the gases escape from the arc and one at a distance from the arc, and utilizing gases that have been subjected to the second cooling as the cooling agent for effecting the first cooling.

17. The process of forming oxides of nitrogen from mixtures of oxygen and nitrogen, which consists in bringing said mixed gases under the influence of an electric arc, and, by means of another current of gases, imparting to the gases that have been acted upon by the arc a whirling motion to maintain them free of the arc during their escape therefrom.

18. The process of forming oxides of nitrogen from mixtures of oxygen and nitrogen, which consists in bringing said mixed gases under the influence of an electric arc, allowing the gases of reaction to escape outwardly, and imparting a whirling motion to the escaping gases by means of a current of cooled gases.

19. The process of forming oxides of nitrogen from mixtures of oxygen and nitrogen, which consists in bringing said mixed gases under the influence of an electric arc, imparting a whirling motion to the gases that have been acted upon by the arc, leading them away from the whirling current and cooling them, and utilizing the cooled gases to suddenly and substantially cool and at the same time impart said whirling motion to other volumes of gases that have been acted upon by the arc.

20. The process of forming oxids of nitrogen from mixtures of oxygen and nitrogen, which consists in forming an electric arc, passing the gases to be acted upon in two streams flowing along the arc toward each other, allowing the gases at the juncture of the two streams to escape outwardly, and suddenly and substantially reducing their temperature by means of a current of gases that have been previously acted upon by the electric arc and cooled.

21. The process of forming oxids of nitrogen from mixtures of oxygen and nitrogen, which consists in preheating said mixed gases, bringing them under the influence of an electric arc, cooling the gases of reaction, and conveying the cooled gases adjacent to the locus of reaction to effect a sudden and substantial reduction in the temperature of fresh volumes of gases that have been acted upon by the electric arc.

In testimony of which invention I have hereunto set my hand at Wilmington, Delaware, on this 12th day of July, 1919.

FRANCIS I. du PONT.